(12) United States Patent
Sakaguchi

(10) Patent No.: US 8,554,067 B2
(45) Date of Patent: Oct. 8, 2013

(54) FOCUS DETECTION APPARATUS AND FOCUS DETECTION METHOD

(75) Inventor: Takeshi Sakaguchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/860,146

(22) Filed: Aug. 20, 2010

(65) Prior Publication Data

US 2011/0052168 A1    Mar. 3, 2011

(30) Foreign Application Priority Data

Aug. 28, 2009 (JP) .................................. 2009-198412

(51) Int. Cl.
- G03B 3/00 (2006.01)
- G03B 13/18 (2006.01)
- G03B 13/32 (2006.01)
- G03B 3/10 (2006.01)
- G03B 13/34 (2006.01)

(52) U.S. Cl.
USPC ........................................... 396/96; 396/121

(58) Field of Classification Search
USPC .......................................... 396/96, 123, 121
See application file for complete search history.

(56) References Cited

U.S. PATENT DOCUMENTS

| | | | |
|---|---|---|---|
| 6,577,344 B2 * | 6/2003 | Kadohara et al. | 348/350 |
| 6,904,234 B2 * | 6/2005 | Shimizu | 396/100 |
| 7,512,330 B2 | 3/2009 | Ichimiya | |
| 8,000,591 B2 * | 8/2011 | Karasawa | 396/95 |
| 2006/0177210 A1 | 8/2006 | Ichimiya | |
| 2009/0180772 A1 | 7/2009 | Ichimiya | |
| 2009/0238551 A1 * | 9/2009 | Ichimiya et al. | 396/96 |
| 2010/0328521 A1 * | 12/2010 | Sato et al. | 348/349 |
| 2011/0286734 A1 * | 11/2011 | Hosoi | 396/96 |

FOREIGN PATENT DOCUMENTS

| | | |
|---|---|---|
| JP | 09-054242 A | 2/1997 |
| JP | 2006-072332 A | 3/2006 |
| JP | 2006-220684 A | 8/2006 |
| JP | 2008-299048 A | 12/2008 |

* cited by examiner

*Primary Examiner* — Christopher Mahoney
(74) *Attorney, Agent, or Firm* — Canon U.S.A., Inc. IP Division

(57) ABSTRACT

An apparatus includes a monitor unit configured to monitor and output an accumulation state of a monitor area, which is apart of the detection area, a control unit configured to start an accumulation for focus adjustment in a detection area, and to determine whether the accumulation is ended based on the accumulation state, and to end the accumulation, when it is determined that the accumulation is to be ended, and an adjusting unit configured to use, for a focus adjustment, an output signal in a first area including the monitor area in priority to an output signal in a second area not including the monitor area.

9 Claims, 10 Drawing Sheets

FOCUS DETECTION APPARATUS AND FOCUS DETECTION METHOD

BACKGROUND OF THE INVENTION

1. Field of the Invention

The present invention relates to a focus detection apparatus having a function of automatically adjusting a focus, and a focus detection method.

2. Description of the Related Art

There has conventionally been known a focus detection unit of a so-called phase difference detection method as a focus detection unit of a camera discussed in Japanese Patent Application Laid-Open No. 9-054242. In this method, light fluxes from a subject, passing through different exit pupil areas of a photographing lens, are imaged on a pair of line sensors, and a displacement amount, between relative positions of a pair of subject images obtained through a photoelectric conversion of the subject images, is obtained. Then, a defocus amount of the subject is detected, and the photographing lens is driven based on the detected defocus amount, whereby a focus of the photographing lens can be adjusted.

Japanese Patent Application Laid-Open No. 9-054242 also discusses that, in order to obtain defocus amount at a plurality of range-finding points, a plurality of line sensors, each corresponding to each range-finding point, are provided in a focus detection sensor to perform a focus detection.

On the other hand, there has been known that, as a method for detecting defocus amount at other plurality of range-finding points, a pair of line sensors is divided into a plurality of areas, and a focus detection unit detects the defocus amount at each area. For example, in Japanese Patent Application Laid-Open No. 2006-220684, a line sensor is divided into plural areas, and the defocus amounts at the respective areas are detected. Japanese Patent Application Laid-Open No. 2006-220684 also discusses that line sensors are coupled to make one line sensor so as to increase a focus detection area, whereby a large defocus amount can be detected.

However, in the focus detection unit discussed in Japanese Patent Application Laid-Open No. 9-054242, the size of the focus detection sensor is limited, so that there is a limitation in the number of the range-finding points.

The focus detection unit discussed in Japanese Patent Application Laid-Open No. 2006-220684 needs a frame memory or a circuit configuration that can transfer an accumulation signal to each frame memory with non-destroyed manner, to detect the defocus amounts of the respective divided areas.

SUMMARY OF THE INVENTION

According to an aspect of the present invention, an apparatus includes a starting unit configured to start an accumulation in a focus-state detection area; a monitor unit configured to monitor and output an accumulation state of a monitor area, which is a part of the detection area; an ending unit configured to determine whether the accumulation is ended based on the accumulation state, and to end the accumulation, when it is determined that the accumulation is ended, and an adjusting unit configured to use, for a focus adjustment, an output signal in a first area including the monitor area in priority to an output signal in a second area not including the monitor area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

One example of an exemplary embodiment for embodying the present invention is as stated in the following exemplary embodiment.

Figure 1:
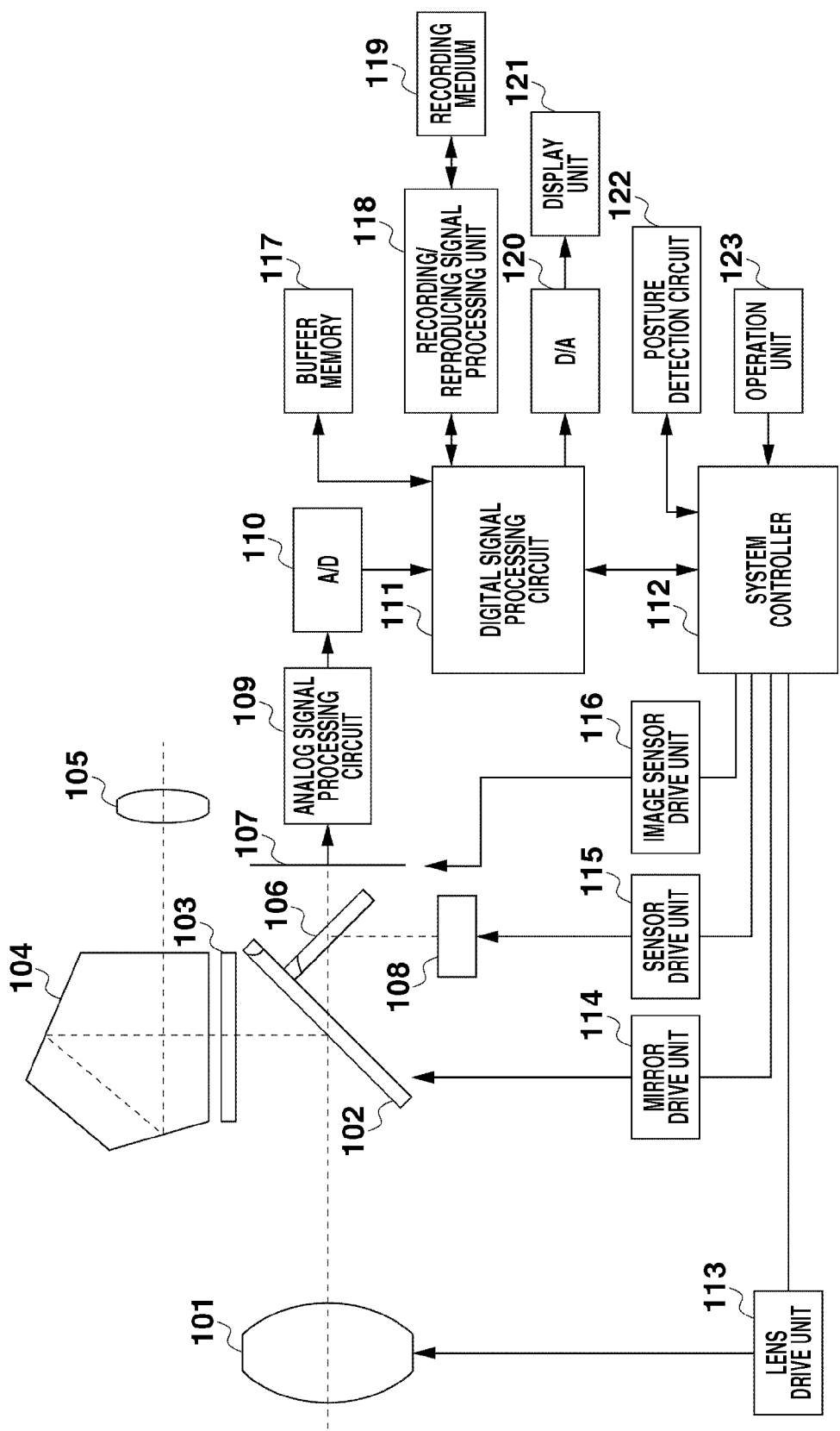
FIG. 1 is a block diagram of a camera.

FIG. 1 is a block diagram of a camera that is one example of an imaging apparatus. In FIG. 1, the imaging apparatus includes a photographing lens 101, and an image sensor 107, such as a charge-coupled device (CCD) or complementary metal-oxide semiconductor (CMOS) sensor, that receives subject light passing through the photographing lens 101, photoelectrically converts the received light, and outputs image signal data. An imaging signal output from the image sensor 107 is input into an analog signal processing circuit 109. The output signal is converted into a digital signal from an analog signal by an analog/digital (A/D) converter 110.

In FIG. 1, a main mirror 102 having a semi-transmissive part is inserted into a photographing light flux (mirror down). The main mirror 102 retreats to the outside of the photographing light flux during the photographing, and diagonally provided in the photographing optical path during the focus detection. The main mirror 102 directs some light fluxes passing through the photographing lens 101 to a finder photographing lens including a focus plate 103, pentaprism 104, and an eyepiece lens 105, as being diagonally provided in the photographing optical path.

A sub-mirror 106 can be folded or opened with respect to the main mirror 102 in synchronism with the operation of the main mirror 102. Some light fluxes passing through the semi-transmissive part of the main mirror 102 are reflected downward by the sub-mirror 106 to be incident on a focus detection unit 108 of a phase difference system, whereby a focusing state of the photographing lens 101 is detected.

A system controller 112 includes a central processing unit (CPU) that controls the entire camera and a random access memory (RAM) serving as a storage device, and it appropriately controls the operations of respective units.

A lens drive unit 113 is connected to the system controller 112, and includes a communication circuit for performing a communication with the photographing lens 101, a lens drive mechanism that drives lenses for performing a focus adjustment, and a drive circuit thereof. A mirror drive unit 114 is connected to the system controller 112 for driving the main mirror 102 to the outside of the photographing light flux. A sensor control unit 115 is connected to the system controller 112 for controlling the focus detection unit 108. An image sensor drive device 116 is connected to the system controller 112 for driving the image sensor 107.

A digital signal processing circuit 111 is connected to the system controller 112 for performing an image process, such as a shading correction or a gamma correction, to the signal that is converted into a digital signal by the A/D converter 110.

A frame memory 117 is connected to the digital signal processing circuit 111, and can store image signal data corresponding to plural frames imaged by the image sensor 107. The A/D converted signal is temporarily stored in the buffer memory 117. The digital signal processing circuit 111 reads the image signal data stored in the buffer memory 117 to perform the respective processes described above, and the processed image signal data is stored again in the buffer memory 117.

A recording/reproducing signal processing circuit 118 records the image signal data into a recording medium 119 such as a memory card. The recording/reproducing signal processing circuit 118 is connected to the digital signal processing circuit 111. When the image signal data, to which various processes are performed by the digital signal processing circuit 111, is recorded onto the recording medium 119 after it is temporarily stored in the buffer memory 117, the image signal data is compressed using Joint Photographic Experts Group (JPEG) format, for example. On the other hand, when the image signal data is read from the recording medium 119, the recording/reproducing signal processing circuit 118 decompresses the image signal data. The recording/reproducing signal processing circuit 118 includes an interface that performs data communication with the recording medium 119.

A display unit 121 displays a captured image. The display unit 121 is also used to reproduce and display the image signal data recorded on the recording medium 119. When an image is displayed on the display unit 121, the image signal data stored in the buffer memory 117 is read, and then, digital image signal data is converted into an analog video signal by a D/A converter 120. The image is displayed on the display unit 121 by using the analog video signal.

There are two manners to display the image, which is captured by the image sensor 107, onto the display unit 121. One of them is a display manner when a release operation is not performed, i.e., is a display manner called live view that updates and displays one by one the image repeatedly captured by the image sensor 107. The other one is a display manner called freeze image in which the image captured by the image sensor 107 is displayed for a predetermined time after the release operation of the camera.

A posture detection circuit 122 is connected to the system controller 112 for detecting the posture of the camera. A gyroscope, which measures an angle or angular speed of an object, may be used to detect the posture of the camera.

An operation unit 123 is connected to the system controller 112, and is provided with operation members for operating the camera, including a power supply switch for turning on/off a power supply of the camera, a release button, or a setting button for selecting a photographing mode such as a person photographing mode.

When these switches and buttons are operated, a signal according to the operation is input into the system controller 112. A SW1, which is turned on by a first stroke operation (half-pressed operation) of the release button operated by a photographer, and a SW2, which is turned on by a second stroke operation (full-pressed operation) of the release button, are connected to the release button. There are an optional selecting mode, an area increasing mode, and an automatic selecting mode, as a focus adjusting mode. They can appropriately be set by the operation of the photographer.

Figure 2:
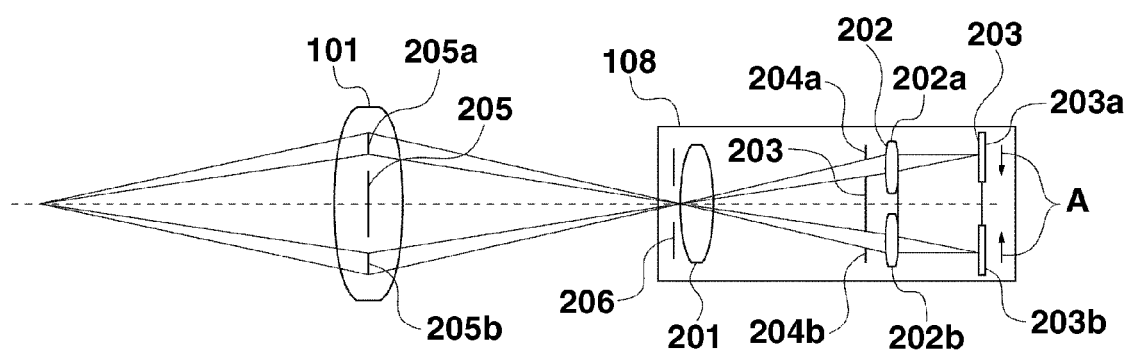
FIG. 2 illustrates a principle of detecting a focusing state by a focus detection unit 108.

FIG. 2 is a view of an optical path for illustrating a principle of detecting a focusing state by the system controller 112 with the use of the focus detection unit 108. In FIG. 2, the components are developed on the optical axis of the photographing lens 101. It is to be noted that the main mirror 102 and the sub-mirror 106 are not illustrated. The components in FIG. 2 similar to those in FIG. 1 are denoted by the same numerals.

The focus detection unit 108, in FIG. 2, includes an expected focal plane 206 of the photographing lens 101, i.e., a field mask arranged in the vicinity of a surface that is conjugate with a film surface, and a field lens 201 arranged in the vicinity of the expected focal plane. A secondary imaging system 202 includes two lenses 202a and 202b. A photoelectric conversion element 203 is arranged at the rear of two lenses 202a and 202b of the secondary imaging system 202 to correspond to these lenses, and includes two line sensor rows 203a and 203b.

A diaphragm 204 having two openings 204a and 204b is arranged to correspond to two lenses 202a and 202b of the secondary imaging system 202. An exit pupil 205 of the photographing lens 101 includes two divided areas 205a and 205b.

In the configuration described above, when the photographing lens 101 is extended to the left in FIG. 2 so that the light flux is imaged at the left from the image sensor 107, a pair of images on the photoelectric conversion element 203 displaces in the direction of an arrow A. The relative displacement amount of the pair of images is detected by the photoelectric conversion element 203, whereby the focusing state of the photographing lens 101 is detected, and the focus adjustment of the photographing lens 101 can be performed. When the photographing lens 101 is extended to the right in FIG. 2, a pair of images on the photoelectric conversion element 203 displaces in the direction reverse to the direction of the arrow A in the figure.

Figure 3:
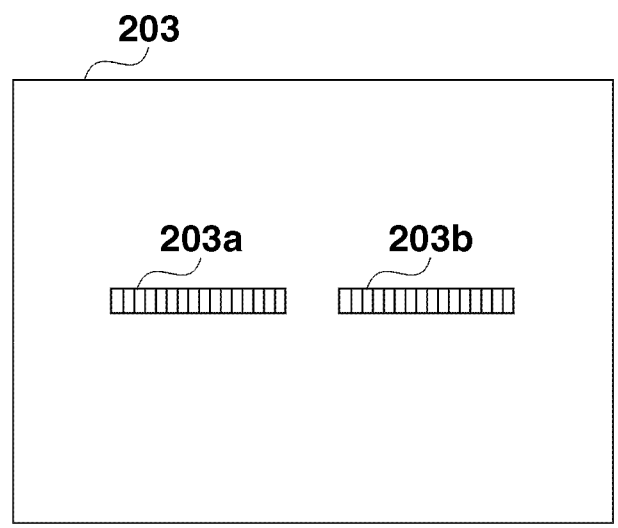
FIG. 3 illustrates an arrangement of a pair of line sensor rows 203a and 203b.

FIG. 3 illustrates the arrangement of the photoelectric conversion element 203 having a pair of line sensor rows 203a and 203b. The line sensor rows are the focus-state detection areas that can detect the focus state, wherein some areas of the line sensor rows corresponding to the autofocus (AF) frame are referred to as a focus detection area. An image displacement amount corresponding to the respective AF frames is detected from a signal output from a plurality of focus detection areas on the pair of line sensor rows 203a and 203b of the photoelectric conversion element 203. In other words, a plurality of AF frames are associated with one set of the pair of line sensor rows.

Figure 4:
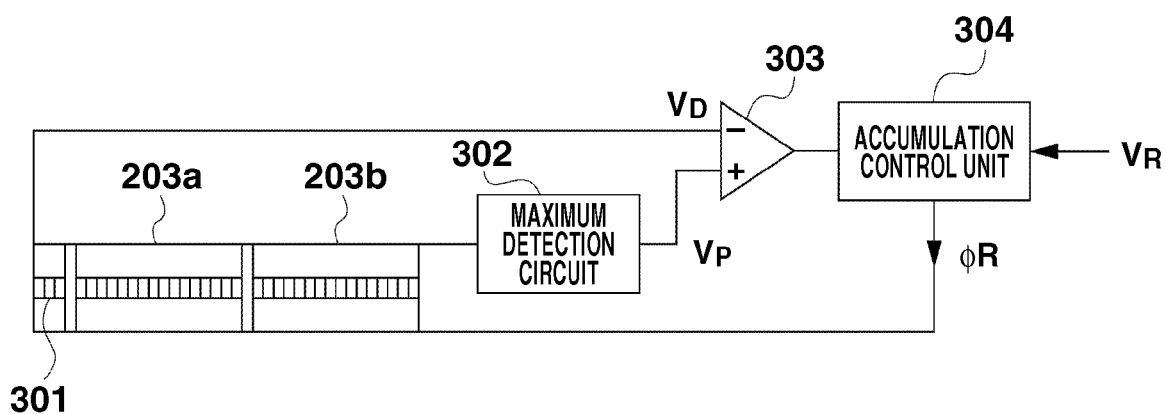
FIG. 4 illustrates a configuration and a control of a photoelectric conversion element 203.

FIG. 4 illustrates the configuration and the control of the photoelectric conversion element 203.

An operation amplifier 303 detects an output (VD) of a shielded dark pixel 301 that is common to the line sensor rows 203a and 203b, and an output (output VP) of a pixel indicating the maximum value) of a maximum value detection circuit 302 that is common to the line sensor rows 203a and 203b. Based on this, signals on the line sensor rows are accumulated until a signal level in an accumulation control area reaches a predetermined level (VR), and the completion of the accumulation operation is controlled at the point when the signal level reaches the predetermined level.

After the accumulation operation is ended, ΦR that is a read signal to an accumulation capacity is sent to the line sensor rows 203a and 203b from an accumulation control unit 304. As described above, the accumulation state of the signal of the photoelectric conversion element 203 is monitored and output, and when the signal level reaches the predetermined level, the accumulation operation is ended. Then, the signal is read, whereby a proper accumulation control can be performed.

The reason why the difference between the maximum value VP and the dark output VD is taken is as follows. Specifically, since signals are accumulated until the maximum value VP reaches the predetermined level VR with the dark output VD being defined as a reference, the level by which a sufficient precision is achieved is attained in the process of detecting the phase difference in the focus detection.

If the accumulation time increases more than the maximum value VP, the output signals are saturated, so that a suitable focus detection cannot be performed. In view of this, the ΦR that is a read signal is fed back to the line sensor rows 203a and 203b. The whole line is controlled at a time with respect to the completion of the accumulation operation on the line sensor.

The accumulation control area indicates the area (monitor area) of the photoelectric conversion element 203, which is the subject to be monitored, when the output signals detected and output from the operation amplifier 303 are controlled to be accumulated on the photoelectric conversion element 203 until they reach the predetermined level (VR).

Figure 8A:
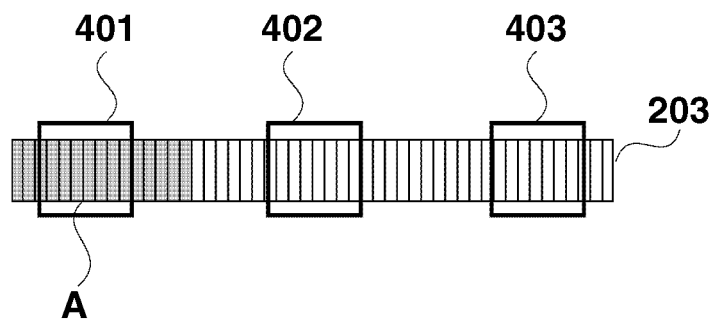
FIG. 8 (including FIG. 8A to FIG. 8C) illustrates an accumulation control area on the pair of line sensor rows 203a and 203b, and AF frames and focus detection areas corresponding to the respective accumulation control areas.
Figure 8B:
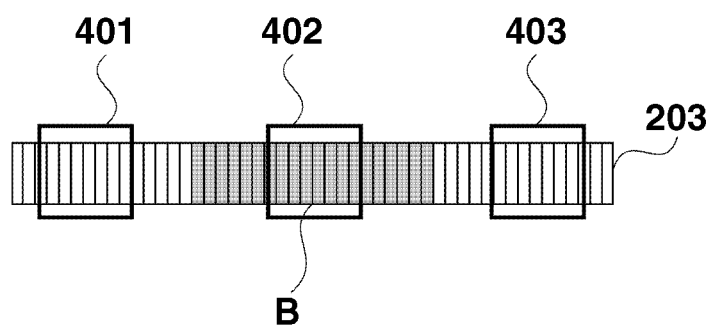
Figure 8C:
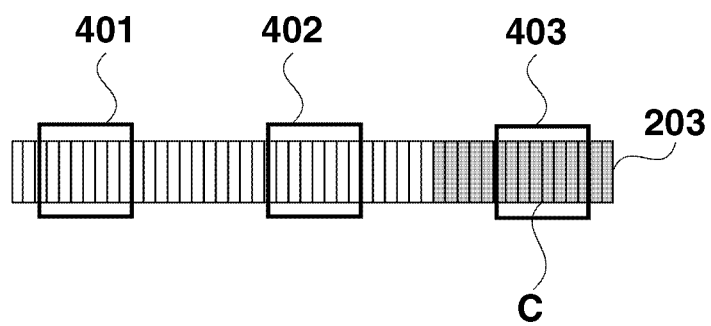

The accumulation control area is painted with gray in FIG. 8 (including FIG. 8A to FIG. 8C). In other words, as for the line sensor rows 203a and 203b, the completion of the accumulation and the reading to the accumulation capacity of the signals for the whole line sensor rows are controlled based on the output signal (monitor output) at a part thereof.

Figure 5:
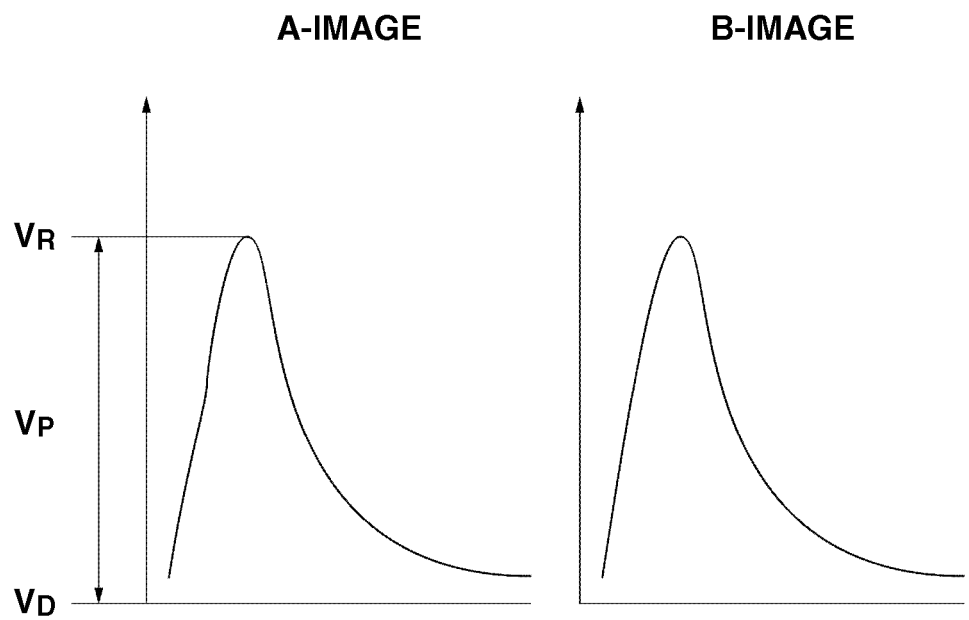
FIG. 5 illustrates image signals of the line sensor rows 203a and 203b as an output VD from a dark pixel 301 being defined as a reference.

FIG. 5 illustrates the image signals of the line sensor rows 203a and 203b with the output VD of the dark pixel 301 being defined as a reference. In FIG. 5, the maximum output VP, which is common to an A-image and a B-image that are the image signals of the line sensor rows 203a and 203b, respectively, is defined as the set level VR. The focus detection is performed by using the image signal at the point when either one of the line sensor pixels of the line sensor rows 203a and 203b falls within a predetermined space including the set level VR.

A signal processing method for detecting the focus displacement amount from the A-image and the B-image output, respectively, from the line sensor rows 203a and 203b will be described below.

When the number of pixels constituting the focus detection pixel is defined as L, an A-image signal is defined as A(i) and a B-image signal is defined as B(i) with the pixel number i (i=0, . . . , L), $$X(k) = \sum_{i=0}^{M} \max\{A(i), B(i+|k|+1)\} - \qquad (1)$$
$$\sum_{i=0}^{M} \max\{A(i+1), B(i+|k|)\} \quad (k<0)$$
$$= \sum_{i=0}^{M} \max\{A(i+k), B(i+1)\} -$$
$$\sum_{i=0}^{M} \max\{A(i+k+1), B(i)\} \quad (k \geq 0)$$
$$= X_1(k) - X_2(k)$$

or $$X(k) = \sum_{i=0}^{M} \min\{A(i), B(i+|k|+1)\} - \qquad (2)$$
$$\sum_{i=0}^{M} \min\{A(i+1), B(i+|k|)\} \quad (k<0)$$
$$= \sum_{i=0}^{M} \min\{A(i+k), B(i+1)\} -$$
$$\sum_{i=0}^{M} \min\{A(i+k+1), B(i)\} \quad (k \geq 0)$$
$$= Y_1(k) - Y_2(k)$$

are calculated for $k1 =< k =< k2$. It is to be noted that M is a calculated pixel number represented by (M=L−|k|), k is called a relative displacement amount, and k1 and k2 are generally grasped as −L/2, L/2. The operators of max{a, b} indicates that the greater one is extracted from a and b, while operators of min{a, b} indicates that the smaller one is extracted from a and b.

Accordingly, X1(k), X2(k), Y1(k), and Y2(k) in the formulas (1) and (2) can be considered to be a correlation amount in abroad sense. Considering the formulas (1) and (2) in detail, X1(k) and Y1(k) represent the correlation amount in the displacement of (k−1), while X2(k) and Y2(k) represent the correlation amount in the displacement of (k+1), respectively, under present circumstances. Therefore, the evaluation amount X(k) that is the difference between X1(k) and Y2(k) means the amount of change in the correlation amount of the subject-image signals A(i) and B(i) in the relative displacement amount k.

From the above-mentioned definition, the correlation amounts X1(k) and X2(k) become the minimum when the correlation between two images is the highest. Therefore, X(k), which is the amount of change thereof, has to be "0" at the highest correlation, and has to have a negative slope. However, since the X(k) is discrete data, the focus displacement amount PR not more than the pixel unit can be detected by performing $$X(kp) >= 0, X(kp+1) < 0 \qquad (3), \text{and}$$

performing an interpolation operation of $$PR = kp + X(kp)/\{X(kp) - X(kp+1)\} \qquad (4),$$

considering that the peak of the correlation amount is present at the zone of [kp, kp+1] of the relative displacement where the X(kp)−(kp+1) becomes the maximum.

On the other hand, from the above-mentioned definition, the correlation amounts Y1(k) and Y2(k) become the maximum, on the contrary to the correlation amounts X1(k) and X2(k), when the correlation between two images is the highest. Therefore, Y(k), which is the amount of change thereof, has to be "0" at the highest correlation, and has to have a positive slope. As for the Y(k), the focus displacement amount PR not more than the pixel unit can also be detected $$Y(kp)=<0, Y(kp+1)>0 \quad (5), \text{ and}$$

when Y(kp)−Y(kp+1) is the maximum by performing an interpolation operation of $$PR=kp+|Y(kp)/\{Y(kp)-Y(kp+1)\}| \quad (6)$$

From the focus displacement amount PR obtained from the formula 4 or the formula 6, the defocus amount DEF for the expected imaging surface of the subject imaging surface can be obtained from the following formula 7.

$$DEF=K \times PR \quad (7)$$

In the formula 7, K is a conversion coefficient determined based on the size of an opening angle of a barycenter of the light flux passing through a pair of range-finding pupils.

The operation of the camera according to the present exemplary embodiment will be described with reference to FIG. 6.

In the camera according to the present exemplary embodiment, a plurality of AF frames are associated with one set of a pair of line sensor rows. The above-mentioned defocus amount is obtained for each AF frame. The camera is configured to obtain a sense of stability in the operation of the AF.

In step S101, the system controller 112 firstly determines whether the SW1, which is one of the operation members, is pressed. If the SW1 is not pressed (NO in step S101), the processing is repeated until the SW1 is pressed. On the other hand, when the SW1 is pressed (YES in step S101), the processing proceeds to step S102.

In step S102, a focus detection control is performed. The details of the focus detection control will be described below. In step S103, an AF frame selection is performed. The details of the AF frame selection will be described below.

In step S104, it is determined whether one focusing state selected in step S103 is in focus. If it is not in focus (NO in step S104), the processing proceeds to step S105. On the other hand, if it is in focus (YES in step S104), the processing proceeds to step S106.

In step S105, the system controller 112 converts the defocus amount, which is the focusing state detected in step S103, into a pulse number that is a drive amount of the lens, and drives the photographing lens 101 through the lens drive unit 113.

In step S106, the system controller 112 determines whether the SW2, which is one of the operation members, is pressed. If the SW2 is not pressed (NO in step S106), the processing in step S106 is repeated. On the other hand, if the SW2 is pressed (YES in step S106), the processing proceeds to step S107.

In step S107, the system controller 112 drives the main mirror 102 to the outside of the photographing light flux through the mirror drive unit 114, and drives the image sensor 107 through the image sensor drive device 116 to output the image signal data. Then, the respective image processes are performed, and thereafter, the image signal data is recorded onto the recording medium 119.

The details of the accumulation control of the line sensor rows 203a and 203b described referring to FIGS. 3 and 4 will next be described with reference to FIGS. 7 to 9.

When the optional selecting mode in which a photographer freely selects the AF frame is selected in the setting of the mode by the operation member 123, the accumulation control is performed with the accumulation control area corresponding to one optional point being defined as a subject. The output signal from the whole photoelectric conversion element illustrated in FIG. 9 is obtained, and the defocus amount is calculated based on the signal output corresponding to the selected AF frame, whereby the focus adjustment is performed.

Figure 6:
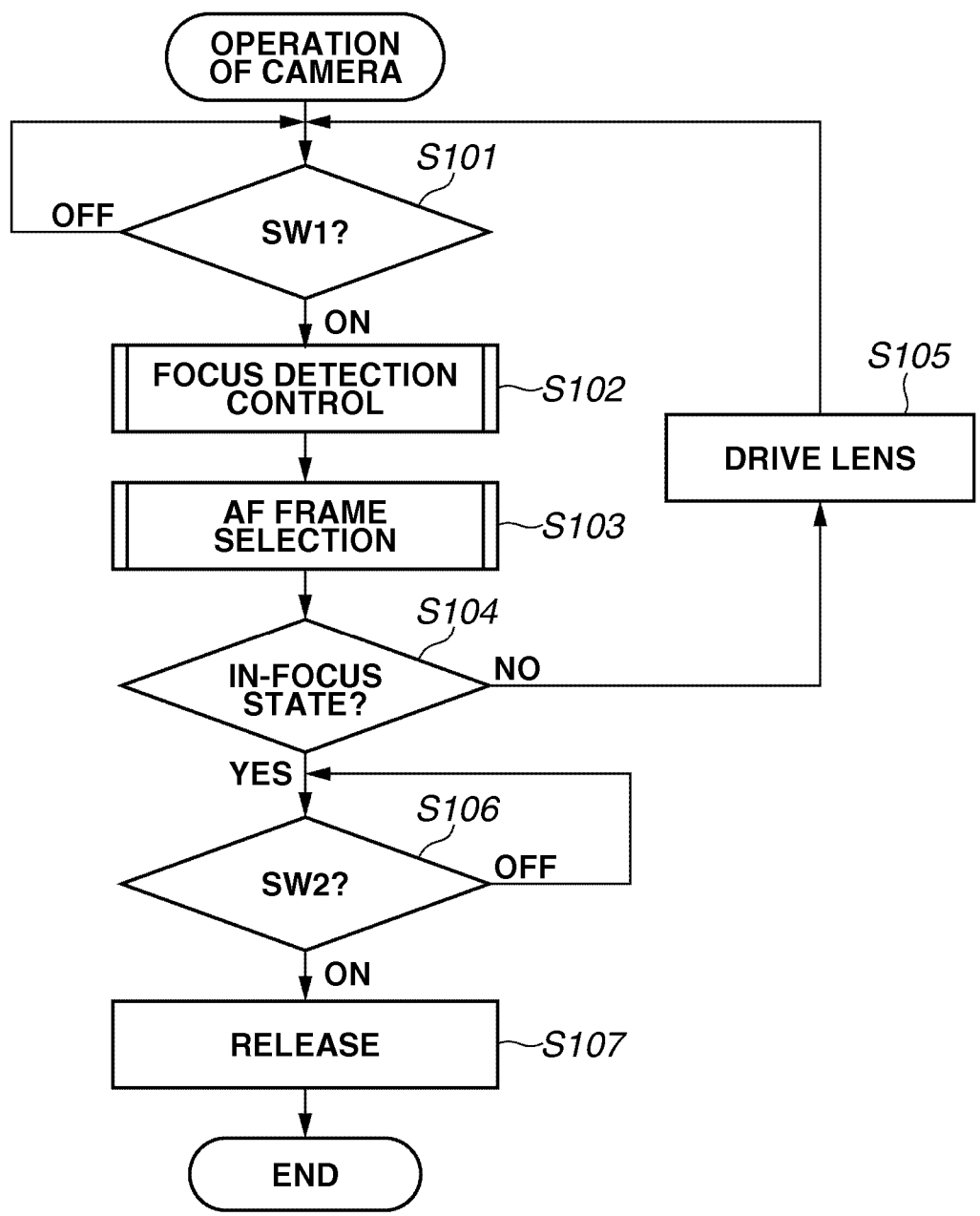
FIG. 6 is a flowchart illustrating an operation of a camera.

With reference to FIG. 6, in the focus detection control in step S102, the accumulation control and the focus detection control within the accumulation control area corresponding to the optional AF frame set by the photographer are performed. Step S103 is not performed, and in step S104, it is determined whether the focusing state of the optional AF frame set beforehand by the photographer is in focus.

Figure 7:
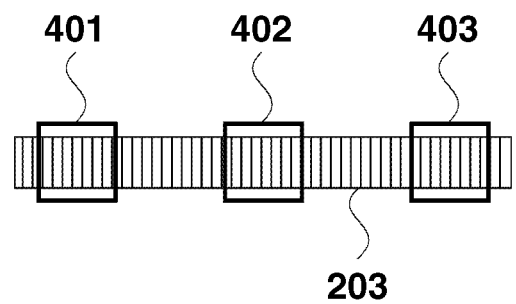
FIG. 7 describes a relationship between a pair of line sensor rows 203a and 203b, and an AF frame.

FIG. 7 is a diagram illustrating a back projection of the pair of line sensor rows 203a and 203b of the photoelectric conversion element 203 on the field mask 206 (on the primary imaging surface). In other words, FIG. 7 is a diagram illustrating the positional relationship among the line sensor rows 203a and 203b, and the AF frame. The respective three areas are cut out from the output signals of the line sensor rows, whereby the focusing state (defocus amount DEF) of the photographing lens for the three different areas in the subject space can be detected.

FIG. 8 (including FIG. 8A to FIG. 8C) illustrates the accumulation control areas of the pair of line sensor rows 203, and the AF frame and the focus detection area corresponding to the respective accumulation control areas.

The accumulation control area A and the focus detection area A in FIG. 8A are associated with an AF frame 401. Accordingly, when the focus is intended to be adjusted in the AF frame 401, the accumulation control area A of the line sensor row is selected. After the output signal obtained from the accumulation control area A reaches the predetermined level, the accumulation for the whole line sensor row (specifically, the whole focusing state detection area) is ended and read. The focusing state (defocus amount DEF) is detected based on the output signal of the focus detection area A, and based on this, the photographed lens 101 is moved to perform the focus adjustment.

The accumulation control area B and the focus detection area B in FIG. 8B are associated with the AF frame 402. The accumulation control area C and the focus detection area C in FIG. 8C are associated with the AF frame 403.

Similarly, the above-mentioned associated accumulation control areas and the focus detection areas B and C are selected to detect the focusing state (defocus amount DEF) for the AF frames 402 and 403.

On the other hand, when the area increasing mode is selected in the setting of the mode on the operation unit 123, the accumulation control for the line sensor rows 203a and 203b described below is performed.

The area increasing mode is a focus adjusting mode in which the AF frame having higher reliability is selected from the AF frame selected by the photographer and the AF frames around the selected AF frame to perform the focus adjustment. The same applies to the case in which the automatic selecting mode is selected in which the AF frame having higher reliability is selected from a plurality of AF frames to perform the focus adjustment.

In the case of the area increasing mode or the automatic selecting mode in which the focus detection is performed for the plurality of AF frames, the result of the focus detection might be unstable depending on the selection of the accumulation control area of the line sensor rows 203a and 203b of the photoelectric conversion element. This is because the partial reading cannot be performed in the line sensor rows.

For example, when the accumulation control is performed based on an image signal of a bright subject, the amplitude of an image signal of a dark subject becomes small, or charges are easy to be saturated because the image signal of the bright image is outside the accumulation control area. Therefore, the reproducibility of the subject image might be reduced.

Specifically, the examples of the output signals on the line sensor rows of the photoelectric conversion element 203 for each photographing scene will be described below with reference to output signals A, B, and C in FIG. 9.

Figure 9:
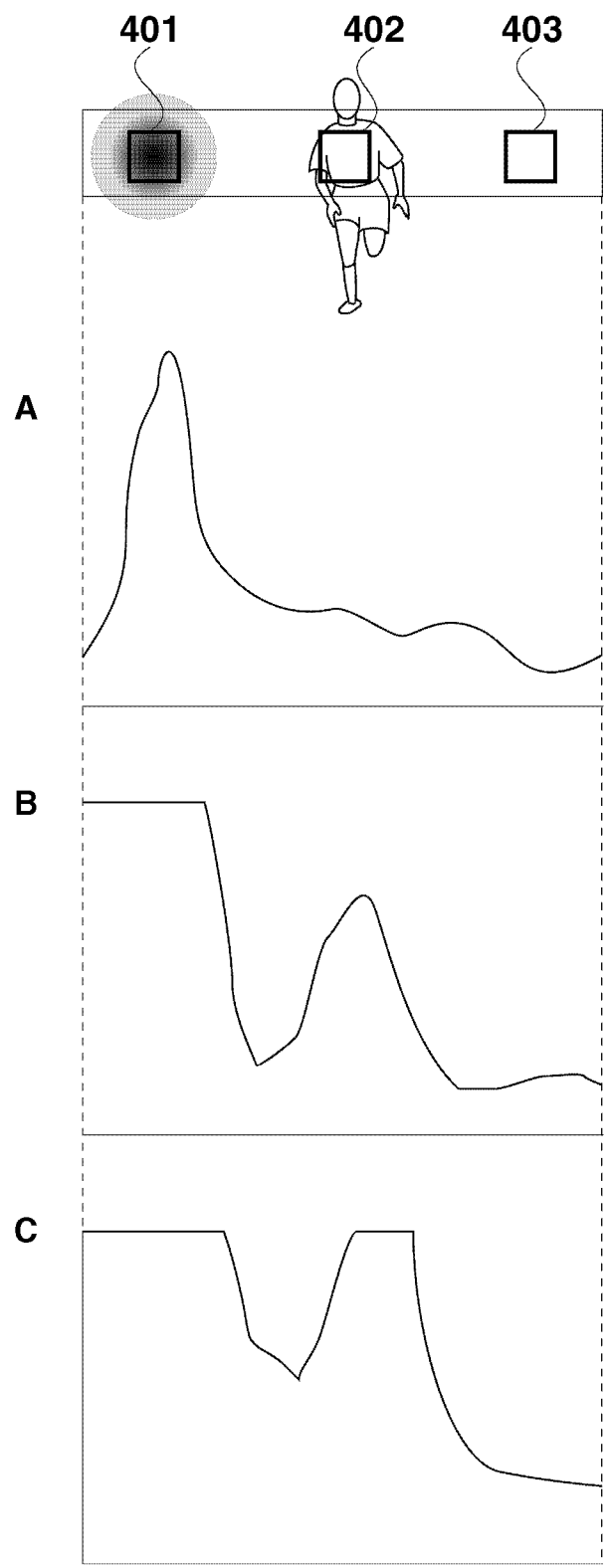
FIG. 9 illustrates an example of an output signal from the pair of line sensor rows.

FIG. 9 represents that a bright subject is present on the AF frame 401, a main subject is present on the AF frame 402, and there is no subject on the AF frame 403. The main subject on the AF frame 402 has brightness darker than that of the bright subject on the AF frame 401, and the area on the AF frame 403 has brightness darker than that of the main subject on the AF frame 402.

The output signal A of the line sensor rows in FIG. 9 is the one when the accumulation control area A in FIG. 8A is selected. Since the output signal A is the one obtained by performing the accumulation control by using the image signal of the bright subject on the AF frame 401, the amplitude of the image signal of the main subject on the AF frame 402 is very small. Therefore, the focusing state (defocus amount DEF) of the AF frame 402 cannot be detected.

The output signal B of the line sensor rows in FIG. 9 is the one when the accumulation control area B in FIG. 8B is selected. In the output signal B, the image signal of the bright subject on the AF frame 401 is saturated, but the amplitude of the image signal of the subject on the AF frame 402 is not small. Therefore, the focusing state (defocus amount DEF) of the AF frame 402 can be detected.

The output signal C of the line sensor rows in FIG. 9 is the one when the accumulation control area C in FIG. 8C is selected. In the output signal C, the image signal of the bright subject on the AF frame 401 and the image signal of the main subject on the AF frame 402 are saturated, because the AF frame C is darker than the subjects on the other AF frames.

The image signal of the subject on the AF frame 402 in the output signal C is saturated more than in the output signal B. Therefore, the reproducibility of the subject image is reduced, with the result that the focusing state (defocus amount DEF) cannot be detected, or even if it can be detected, the focus is very inaccurate.

When the main AF frame is the AF frame 402, the focusing state (defocus amount DEF) cannot be detected, or even if it can be detected, the focusing state is inaccurate, depending on the setting of the accumulation control area, as described above.

Figure 10:
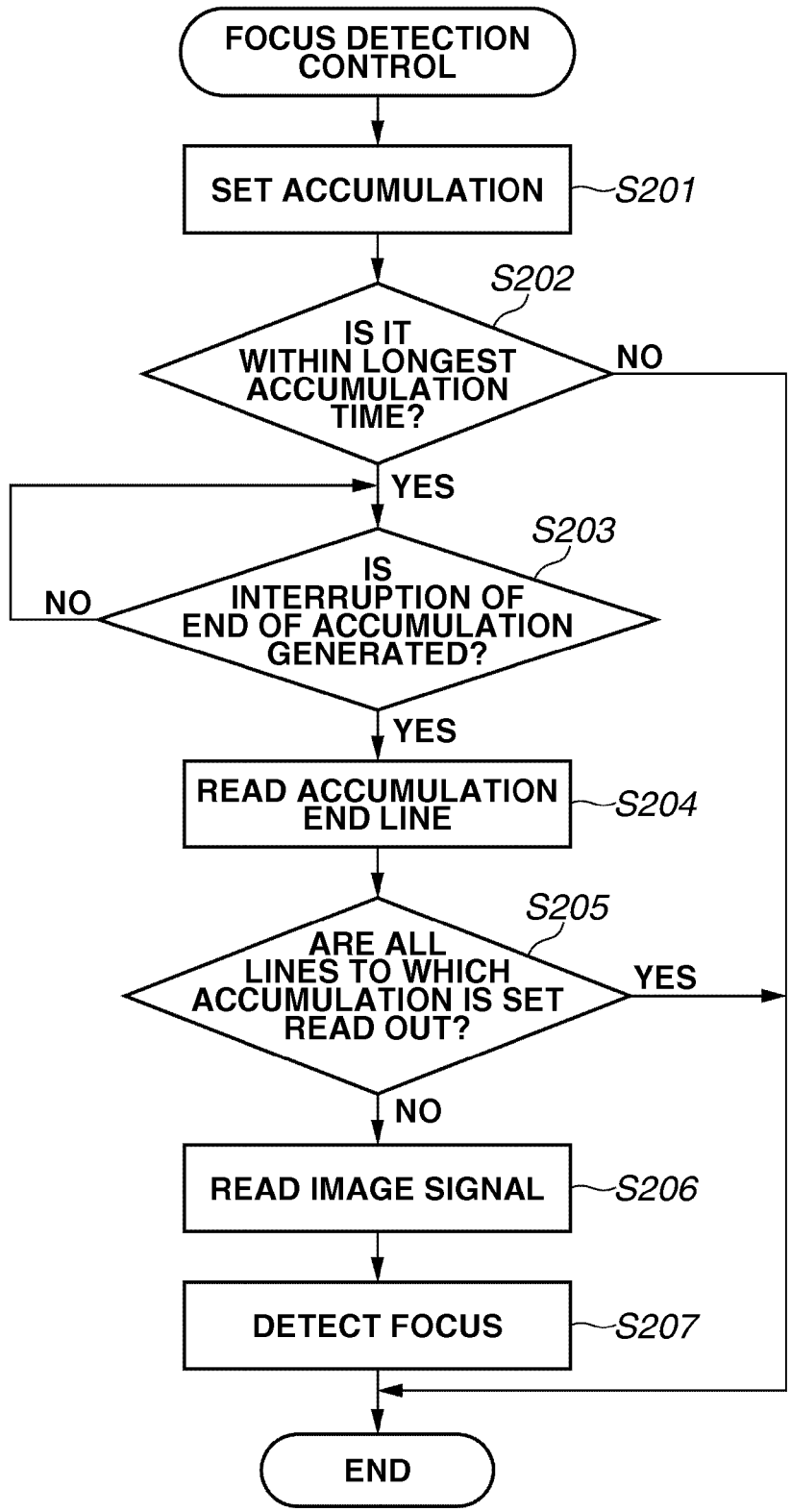
FIG. 10 is a flowchart illustrating the focus detection control.

The priority order is provided on selecting the AF frame in the present exemplary embodiment to prevent the occurrence of the problem described above. The focus detection control (the case in which the focus detection is performed for each focus detection area corresponding to each of the plurality of AF frames, and the AF frame is selected according to the result of the detection) in step S102 in FIG. 6 will be described with reference to FIG. 10.

In the above description, it is supposed that three focus detection areas are cut from the output signal of one line sensor row to detect the focusing state of the photographing lens to three different areas in the subject space as illustrated in FIG. 7.

In step S201, the system controller 112 sets a power supply for driving the focus detection unit 108 through the sensor control unit 115, sets the accumulation for the photoelectric conversion element 203 that performs the accumulation control, selects the accumulation control area on the photoelectric conversion element, and sets the longest accumulation time. The system controller 112 gives an instruction to start the accumulation, and at the same time, starts a timer.

In the description below, the accumulation control area B in FIG. 8B is selected for the line sensor row on the photoelectric conversion element. This is supposed when the photographer selects the AF frame B in the area increasing mode, for example. Alternatively, it is supposed that the accumulation control is performed with importance being placed on the AF frame B, since the center takes priority in the automatic selecting mode. This is based on the consideration that the central one is frequently selected by the photographer, if there are three AF frames as illustrated in FIG. 8.

If there are two AF frames, it is presumed that the outer AF frame is frequently selected by the photographer. Therefore, it may be configured in such a manner that the accumulation control is performed with importance being placed on the outer AF frame.

When the photographer selects the AF frame A in the area increasing mode, for example, the accumulation control area on the photoelectric conversion element may be fixed to the accumulation control area A in FIG. 8A.

In step S202, the accumulation time from the start of the accumulation and the longest accumulation time set in step S201 are compared. When the accumulation time is longer than the longest accumulation time (NO in step S202), the focus detection control is ended. On the other hand, when the accumulation time is shorter than the longest accumulation time (YES in step S202), the processing proceeds to step S203.

In step S203, it is determined whether an interruption signal is generated. When the interruption signal is not generated (NO in step S203), the processing in step S203 is repeated. The interruption signal is notified to the system controller from the focus detection unit 108 through the sensor control unit 115, when the accumulation on the photoelectric conversion element set in step S201 is ended. Specifically, in the accumulation control area B to which the accumulation is set, the accumulation operation of the line sensor row is completed, and the interruption signal is generated, after the signal reaches the predetermined signal value. On the other hand, when the interruption signal is generated (YES in step S203), the processing proceeds to step S204.

In step S204, when the accumulation control of the line sensor row is completed, the system controller 112 reads accumulation end information stored in a built-in memory (not illustrated) in the sensor control unit 115, and processes which photoelectric conversion element ends the accumulation.

In step S205, it is determined whether the output signal is read from all line sensor rows to which the accumulation is set in step S201. When the output signal is read from all line sensor rows to which the accumulation is set (YES in step S205), the focus detection control is ended. On the other hand, the output signal is not read from all line sensor rows to which the accumulation is set (NO in step S205), the processing proceeds to step S206.

In step S206, the system controller 112 reads the output signal from the line sensor row through the sensor control unit 115. In step S207, the focus detection is executed. The above-described signal processing method for detecting the focus displacement amount is applied to the focus detection.

Next, the AF frame selection in step S103 in FIG. 6 will be described. The AF frame selection is a process of selecting one AF frame among one or more AF frames in order that the focus is finally adjusted on one AF frame, when a range-finding is performed in one or more AF frames. As for the selection of the AF frame, there is a method in which the closest one is selected among the AF frames having high reliability in the detected focusing state.

In the AF frame selection, the priority of the AF frame to be selected is changed according to the selected accumulation control area, as specifically stated below. In step S201 in FIG. 10, it is supposed that the accumulation control area B illustrated in FIG. 8B is selected as the accumulation control area of the line sensor row of the photoelectric conversion element 203. In this case, the focusing state detected from the focus detection area B, among the focusing states detected from the focus detection areas A, B, and C in FIG. 8 from the output signal of the line sensor row, is selected preferentially.

Similarly, in step S201, when the accumulation control area A in FIG. 8A is selected as the accumulation control area of the line sensor row of the photoelectric conversion element 203, the focusing state detected from the focus detection area A is selected preferentially. When the accumulation control area C in FIG. 8C is selected as the accumulation control area of the line sensor row of the photoelectric conversion element 203, the focusing state detected from the focus detection area C is selected preferentially.

In the description above, the accumulation control area of the line sensor row of the photoelectric conversion element 203 is fixed, but it may be varied according to the detected focusing state. Specifically, if the reliability of the focusing state detected from the focus detection area associated with the accumulation control area selected in the range-finding this time is low, the accumulation control area may be changed to the other one in the next focus adjusting operation. This needs to perform the focus adjusting operations a plurality of times. However, the output signal of the line sensor row by which the reproducibility of the subject image is high can be obtained in any one of the focus adjusting operations.

When even the output signal, which is within the focus detection area associated with the outside of the accumulation control area, is not saturated, the priority is not given to the selection of the focusing state detected in the focus detection area associated with the accumulation control area, but the AF frame selection may be performed equivalently.

It has been described above that the accumulation control area A and the focus detection area A are associated with the AF frame 401, the accumulation control area B and the focus detection area B are associated with the AF frame 402, and the accumulation control area C and the focus detection area C are associated with the AF frame 403. However, the present invention is not limited thereto. Specifically, the accumulation control area and the focus detection area corresponding to the AF frame may not totally coincide with each other.

As described above, in the present exemplary embodiment, a plurality of focus detection areas of the AF frame are cut out from the output signal of the line sensor row of the photoelectric conversion element to detect the focusing state of the photographing lens for the different areas in the subject space. Since the focusing state detected in the focus detection area associated with the accumulation control area of the line sensor row of the photoelectric conversion element is selected preferentially, the present invention can prevent the focusing state detected in the focus detection area associated with the outside of the accumulation control area from being selected, and hence, the focus from being inaccurate. Therefore, a sense of stability in the focus adjusting operation can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-198412 filed Aug. 28, 2009, which is hereby incorporated by reference herein in its entirety.

What is claimed is:

1. An apparatus comprising:
a focus detection sensor that detects a focal state of a photographing lens based on an image signal of an object based on light flux obtained from an object light transmitted through the photographing lens, and that has a plurality of detection areas for detection of the focal state of the photographing lens;
a monitor unit configured to monitor and output an accumulation state of a signal level of a monitor area, which is associated with the detection areas;
a control unit configured to start an accumulation in the plurality of detection areas at once, and to end the accumulation in the plurality of detection areas at once, when it is determined that the signal level reaches a predetermined level;
a selection unit configured to select a detection area to perform focus adjustment from the plurality of detection areas, which is associated with the monitor area; and
an adjusting unit configured to use, for the focus adjustment, a focal state of a photographing lens in the area selected by the selection unit.

2. The apparatus according to claim 1, wherein the plurality of detection areas are areas each associated with a corresponding AF frame.

3. The apparatus according to claim 1,
wherein the selection unit selects a detection area for focusing from other detection areas in a case where reliability of the focal state of the detection area associated with the monitor area is lower than a predetermine value than other detection areas.

4. A focus detection method comprising:
starting an accumulation for focus adjustment in a plurality of focus detection areas;
monitoring and outputting an accumulation state of a signal level of a monitor area, which is associated with the focus detection areas;
determining whether the accumulation is ended based on the accumulation state, and ending the accumulation, when it is determined that the signal level reaches a predetermined level;
selecting a focus detection area to perform the focus adjustment from the plurality of focus detection areas, which is associated with the monitor area.

5. The method according to claim 4, wherein the plurality of detection areas are areas each associated with a corresponding AF frame.

6. The method according to claim 4,
wherein, in a case where reliability of the focal state of the detection area associated with the monitor area is lower than a predetermine value than other detection areas, detection area for focusing is selected from other detection areas.

7. An apparatus comprising:
a focus detection sensor that detects a focal state of a photographing lens based on an image signal of an object based on light flux obtained from an object light transmitted through the photographing lens, and that has a plurality of detection areas for detection of the focal state of the photographing lens;
a monitor unit configured to monitor and output an accumulation state of a signal level of a monitor area, which is associated with the detection areas;

an area selecting unit configured to select the monitor area;

a control unit configured to start an accumulation in the plurality of detection areas at once, and to end the accumulation in the plurality of detection areas at once, when it is determined that the signal level reaches a predetermined level;

a selection unit configured to select the detection area to perform focus adjustment from the plurality of detection areas based on the reliability of the focal state; and an adjusting unit configured to use, for the focus adjustment, a focal state of a photographing lens in the area selected by the selection unit, wherein the selection unit lowers the reliability of the focal state of the detection area which does not associate with the monitor area selected by the area selection unit.

8. The apparatus according to claim 7, wherein the plurality of detection areas are areas each associated with a corresponding AF frame.

9. The apparatus according to claim 7, wherein the selection unit does not lower the reliability of the focal state of the detection area that does not associate with the monitor area selected by the area selection unit in a case where the image signal of the detection area that does not associate with the monitor area selected by the area selection unit.

\* \* \* \* \*